(12) United States Patent
Thomas, Jr.

(10) Patent No.: US 10,459,061 B2
(45) Date of Patent: Oct. 29, 2019

(54) FFT-BASED DISPLACED PHASE CENTER ARRAY/ALONG-TRACK INTERFEROMETRY ARCHITECTURE

(71) Applicant: SRC, Inc., North Syracuse, NY (US)

(72) Inventor: Daniel D. Thomas, Jr., Baldwinsville, NY (US)

(73) Assignee: SRC, INC., North Syracuse, NY (US)

( * ) Notice: Subject to any disclaimer, the term of this patent is extended or adjusted under 35 U.S.C. 154(b) by 362 days.

(21) Appl. No.: 14/706,028

(22) Filed: May 7, 2015

(65) Prior Publication Data

US 2018/0100920 A1      Apr. 12, 2018

Related U.S. Application Data

(60) Provisional application No. 61/990,452, filed on May 8, 2014.

(51) Int. Cl.
  *G01S 3/14*      (2006.01)
  *H04N 19/513*    (2014.01)
  *H04N 19/547*    (2014.01)
  *G01S 13/90*     (2006.01)
  (Continued)

(52) U.S. Cl.
  CPC ............ *G01S 3/14* (2013.01); *G01S 13/9023* (2013.01); *G01S 13/9029* (2013.01); *H04N 19/513* (2014.11); *H04N 19/547* (2014.11)

(58) Field of Classification Search
  CPC .. G01S 13/90; G01S 13/9017; G01S 13/9029; G01S 13/5244; G01S 13/9035
  See application file for complete search history.

(56) References Cited

U.S. PATENT DOCUMENTS 5,482,044 A   1/1996   Lin et al.
5,546,084 A   8/1996   Hindman
(Continued)

FOREIGN PATENT DOCUMENTS

CN     102955158        3/2013
EP       2725382        4/2014
KR    20110060626 A     6/2011

OTHER PUBLICATIONS

Guo et al: "Ground Moving Target Indication via Multichannel Airborne SAR", IEEE, 2011.*
(Continued)

*Primary Examiner* — Ruiping Li
(74) *Attorney, Agent, or Firm* — Bond Schoeneck & King, PLLC; George R. McGuire

(57) ABSTRACT

A radar architecture comprising a computing device having a DC subtraction module, programmed to average a first value of a first pixel from a first received SAR image and a second value of a second pixel from a second received SAR image, to produce an averaged value, and to subtract the averaged value from the first value, resulting in a first DC subtracted pixel value, and to subtract the averaged value from the second value, resulting in a second DC subtracted pixel value; a DFT processing module programmed to receive the first DC subtracted pixel value and the second DC subtracted pixel value and to output a first DFT output comprising a plurality Doppler bins; and a detector module programmed to determine if the output of the DFT represents the presence of a target, and to estimate range-rate via a lookup table.

18 Claims, 8 Drawing Sheets

(56) References Cited

U.S. PATENT DOCUMENTS

| | | | |
|---|---|---|---|
| 5,659,318 | A | 8/1997 | Madsen et al. |
| 5,708,436 | A | 1/1998 | Luz et al. |
| 5,818,383 | A | 10/1998 | Stockburger et al. |
| 5,995,038 | A | 11/1999 | Ikizyan |
| 6,046,695 | A | 4/2000 | Poehler et al. |
| 6,400,306 | B1 | 6/2002 | Nohara et al. |
| 6,750,804 | B2 | 6/2004 | Chen et al. |
| 7,006,034 | B1 | 2/2006 | Krikorian et al. |
| 7,154,434 | B1 | 12/2006 | Sego |
| 7,498,968 | B1 | 3/2009 | Bielek et al. |
| 8,035,545 | B2 | 10/2011 | Pruett et al. |
| 8,644,572 | B2 | 2/2014 | Izatt et al. |
| 2011/0299733 | A1 | 12/2011 | Jahangir et al. |
| 2012/0274499 | A1 | 11/2012 | Chang |

OTHER PUBLICATIONS

Thomas et al: "A Fast Fourier Transform (FFT)-Based Along Track Interferometry (ATI) Approach to SAR-based Ground Moving Target Indication (GMTI)", Proc. of SPIE, May 5, 2014.*

Budillon et al. "Multichannel along-track interferometric SAR systems: moving targets detection and velocity estimation" International Journal of Navigation and Observation 2008 http://www.hindawi.com/journals/ijno/2008/310656.

Chen "Performance assessment of along-track interferometry for detecting ground moving targets" Radar Conference 2004. Proceedings of the IEEE 2004 http://www.geo.uzh.ch/microsite/rsl-documents/research/SARlab/GMTILiterature/Ver09/PDF/Che04.pdf.

Deming et al. "Simultaneous SAR and GMTI using ATI/DPCA" SPIE Defense+ Security International Society for Optics and Photonics 2014 http://proceedings.spiedigitallibrary.org/proceeding.aspx?articleid=1882661.

Thomas et al. "A fast Fourier transform (FFT)-based along track interferometry (ATI) approach to SAR-based ground moving target indication (GMTI)" SPIE Defense+ Security International Society for Optics and Photonics 2014 http://proceedings.spiedigitallibrary.org/proceeding.aspx?articleid=1882660.

Vu et al. "SAR based adaptive GMTI" SPIE Defense Security and Sensing International Society for Optics and Photonics 2010 http://proceedings.spiedigitallibrary.org/proceeding.aspx?articleid=766177.

* cited by examiner

FFT-BASED DISPLACED PHASE CENTER ARRAY/ALONG-TRACK INTERFEROMETRY ARCHITECTURE

CROSS-REFERENCE TO RELATED APPLICATIONS

The present application claims priority to U.S. Provisional Patent Application Ser. No. 61/990,452, filed May 8, 2014 and entitled "FFT-Based Displaced Phase Center Array/Along-Track Interferometry Architecture," the entire disclosure of which is hereby incorporated by reference in its entirety.

STATEMENT OF GOVERNMENT INTEREST

The invention was made with United States Government support under Project No. RS006 under an Air Force Research Laboratory contract. The United States Government has certain rights in this invention.

FIELD OF THE INVENTION

The present invention relates to methods and systems for Along Track Interferometry Ground Moving Target Indication (ATI/GMTI), and, more specifically, methods and systems for FFT-based displaced phase center ATI/GMTI.

BACKGROUND

In radar applications it is highly desirable, and often necessary, to distinguish a moving target from the surrounding stationary clutter. The techniques to detect the motion of targets on the ground are known as ground moving target indication (GMTI). One such technique is along-track interferometry (ATI). Simply put, Along Track Interferometry (ATI) uses phase to estimate Doppler (which may be translated to a target's range-rate). When processed properly, stationary clutter will exhibit no Doppler shift, this stationary clutter may be subtracted out, revealing the moving targets as distinct from the surrounding clutter.

More specifically, traditional along-track interferometry (ATI) uses two images of the same area formed from the same spatial aperture but formed at different times. In traditional ATI, these images are then conjugate multiplied on a pixel-to-pixel basis. Between images, pixels having only stationary clutter will have the same phase difference. If the phase of each pixel is normalized by that phase difference (so that clutter pixels have identical phase in both images) then a non-zero phase in any of the pixels will indicate either the presence of a mover, noise, or interference. Pixels dominated by noise will have a random phase; these can be eliminated from further consideration by amplitude threshold detection. Clutter biases the target's ATI phase; fortunately, ATI is synergistic with displaced phase center array (DPCA) processing. The previous approach, shown in FIG. 1, combines the two to achieve both clutter cancellation and moving target detection. Once detected, the ATI phase can be used to estimate range-rate, which in turn can be used to estimate the cross-range offset of the target in the SAR image caused by its range rate.

However, this baseline approach has several shortcomings. Minimum detectable velocity is a prime consideration. The traditional approach has limited aperture to work with for any DPCA pair, subject to the constraint of dividing the array at least into thirds, thus setting limitations on the MDV. In addition, the ATI conjugate multiplication of images is effective but does not provide any integration gain—it is simply a phase detector. Accordingly, a need exists in the art for an ATI system that, among other features, allows use of the full aperture, and provides integration gain across all phase centers.

SUMMARY OF THE INVENTION

The present disclosure is directed to inventive methods and systems for detecting the motion of a target, which allows for the use of the full aperture, and provides integration gain. Accordingly, various embodiments herein are directed to method and systems for an FFT-based DPCA/ATI architecture. In an exemplary embodiment, a plurality of SAR images are received, DC bias ("DC") is subtracted on a pixel-by-pixel basis, and the outputs inputted to an FFT, whereupon traditional radar techniques, or novel other techniques suggested herein, may be employed to detect a target and estimate range-rate.

According to an aspect, a method for detecting the motion of a moving target, comprises: receiving a first SAR image having at least a first pixel comprising a first value; receiving a second SAR image, the second SAR image being spatially aligned with the first SAR image, and having at least a second pixel comprising a second value; inputting the first value and second value to a clutter cancelation processing module, and receiving from the clutter cancelation processing a first clutter canceled pixel value and a second clutter canceled pixel value; inputting the first clutter canceled pixel value and the second clutter canceled pixel value into an Discrete Fourier Transform ("DFT") processing module; and receiving from the DFT processing module a first DFT output comprising a plurality of Doppler bins.

In some embodiments, the clutter cancellation module performs the steps of: averaging the first value and second value to produce an averaged value; and subtracting the averaged value from the first pixel value and the second pixel value to produce the first clutter canceled pixel value and the second clutter canceled pixel value.

In some embodiments, the clutter cancelation module applies a temporally adaptive moving target indication algorithm.

In some embodiments, the method further includes the steps of: receiving a first set of inputs from a radar antenna; receiving a second set of inputs from the radar antenna, wherein the second set of inputs are substantially sequentially spatially aligned with the first set of inputs; forming the first SAR image from the first set of inputs; and forming the second SAR image from the second set of inputs.

In some embodiments, the method further includes the steps of transmitting a first signal from a first subarray; receiving with the radar antenna the first signal; transmitting a second signal from a second subarray; and receiving with the radar antenna the second signal.

In some embodiments, the method further includes the step of inserting a predetermined number of zeros to the DFT processing module after inputting the first clutter canceled pixel value and the second clutter canceled pixel value.

In some embodiments, the method further includes the steps of selecting from the first DFT output at least one Doppler bin; and comparing the selected Doppler bin to a predetermined lookup table, the lookup table associating a plurality of Doppler bins with a plurality of range-rate values, to correlate the selected Doppler bin to at least one of the range-rate values within the lookup table.

In some embodiments, the method further includes the steps of: determining that the first DFT output contained a value representative of a moving target; reinputting to the DFT processing module the first clutter canceled pixel value and the second clutter canceled pixel value followed by a predetermined number of zero values, upon determining that the first DFT output contained a value representative of a moving target; receiving from the DFT processing module a second DFT output comprising a second plurality of Doppler bins; selecting from the second DFT output at least one Doppler bin; and comparing the selected value to a predetermined lookup table, the lookup table associating a plurality of Doppler bins with a plurality of range-rate values, to correlate the selected Doppler bin to at least one of the range-rate values within the lookup table.

In some embodiments, the selected value is a greatest value of the Doppler bin values.

In some embodiments, step of determining the first DFT output contains a value representative of a moving target comprises the step of determining whether at least one Doppler bin from the first plurality of Doppler bins has a value greater than a predetermined value.

In some embodiments, the DFT processing module implements an FFT.

According to another aspect, A radar system for detecting the motion of a moving target, comprising: a computing device having a nontransitory storage medium comprising: a clutter cancelation processing module, programmed to receive a first value of a first pixel from a first SAR image, and a second value of a second pixel from a second SAR image, the second SAR image being spatially aligned with the first SAR image, and to output a first clutter canceled pixel value and a second clutter canceled pixel value; a DFT processing module programmed to receive the first clutter canceled pixel value and the second clutter canceled pixel value and to output a first DFT output comprising a plurality Doppler bins; and a detector module programmed to determine if the output of the DFT represents the presence of a target.

In some embodiments, the clutter cancelation processing module is programmed to: average the first value and second value to produce an averaged value; and subtract the averaged value from the first pixel value and the second pixel value to produce the first clutter canceled pixel value and the second clutter canceled pixel value.

In some embodiments, the clutter cancelation processing module is programmed to: apply a temporally adaptive moving target indication algorithm to produce the first clutter canceled pixel value and the second clutter canceled pixel value.

In some embodiments, the computing device further comprises a program module programmed to: receive a first set of inputs from a radar antenna; receive a second set of inputs from the radar antenna, wherein the second set of inputs are sequentially spatially aligned with the first set of inputs; form the first SAR image from the first set of inputs; and form the second SAR image from the second set of inputs.

In some embodiments, the system further comprises an antenna configured to transmit a first signal from a first subarray, to receive the first signal, to transmit a second signal from a second subarray and to receive the second signal.

In some embodiments, the DFT processing module is further programmed to insert a predetermined number of zeros after inputting the second clutter canceled pixel value.

In some embodiments, the detector module is further programmed to: select from the first DFT output at least one Doppler bin; and compare the selected Doppler bin to a predetermined lookup table, the lookup table associating a plurality of Doppler bins with a plurality of range-rate values, to correlate the selected Doppler bin to at least one of the range-rate values within the lookup table.

In some embodiments, the DFT processing module is further programmed to: re-input the first clutter canceled pixel value value and the second clutter canceled pixel value followed by a plurality of zero values, upon a determination by the detector module that the first DFT output contained a value representative of a moving target; wherein the detector module is further programmed to receive from the DFT processing module a second DFT output comprising a second plurality of Doppler bins, select from the second DFT output at least one Doppler bin, and compare the selected value to a predetermined lookup table, the lookup table associating a plurality of Doppler bins with a plurality of range-rate values, to correlate the selected Doppler bin to at least one of the range-rate values within the lookup table.

In some embodiments, the selected value is a greatest value of the Doppler bin values.

In some embodiments, the detector module is programmed to determine whether the DFT output contains a value by comparing the output of the DFT module to a predetermined value.

In some embodiments, the DFT processing module implements an FFT.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the invention will be apparent from and elucidated with reference to the embodiment(s) described hereinafter.

BRIEF DESCRIPTION OF THE DRAWINGS

The present invention will be more fully understood and appreciated by reading the following Detailed Description in conjunction with the accompanying drawings, in which.

DETAILED DESCRIPTION

The present disclosure is directed to invented methods and systems for detecting a moving target. Accordingly, various embodiments herein are directed to methods and systems in which a system (or device) receives a plurality of SAR images, inputs the images to a DC subtraction module, inputs the images to a DFT module, and interprets the output to detect a target an estimate its location and range-rate.

Figure 1:
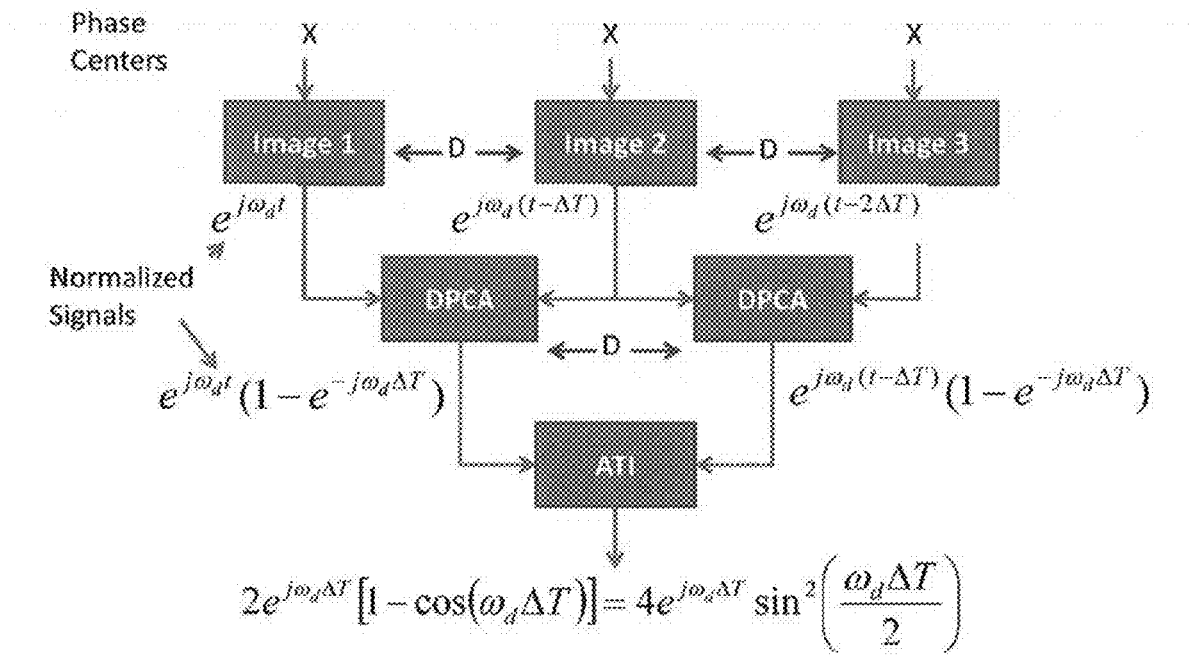
FIG. 1 shows a block diagram of a radar system in accordance with an embodiment.
Figure 2:
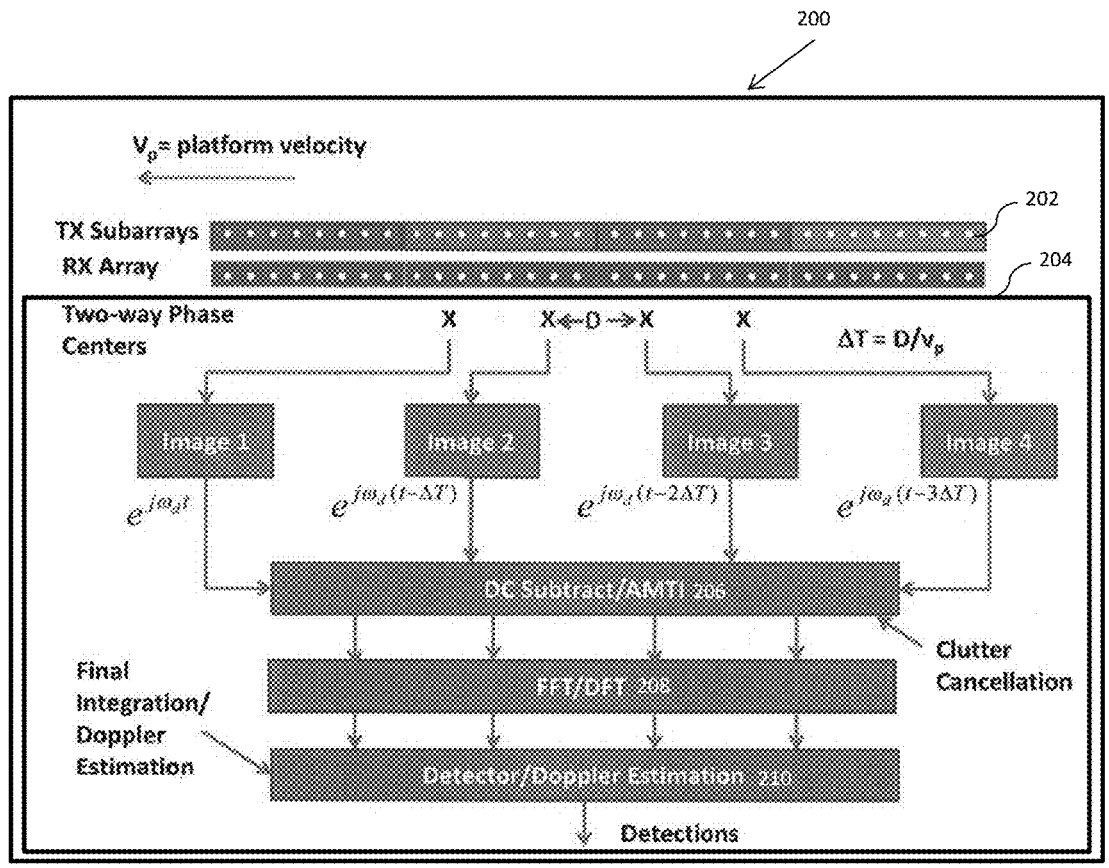
FIG. 2 shows a block diagram of a radar system according to an embodiment.

Referring now to the figures, wherein like references refer to like parts throughout, there is seen in FIG. 2 an exemplary embodiment of a system 200 implementing an FFT-based displaced phase center array/along-track interferometry architecture. In accordance with an embodiment, FIG. 2 shows an antenna array 202 in communication with a computing device 204. Antenna array 202 is configured to receive incoming electromagnetic signals. In an exemplary embodiment, antenna array 202 is divided into multiple subarrays on transmit, but the full array is employed on receive. For example, as shown in FIG. 204, antenna array 202, having thirty-two elements, may be divided into four subarrays on transmit—each subarray using eight elements—but all thirty-two elements may be used on receive. This results four two-way phase centers spanning half the physical array length. One of ordinary skill in the art will appreciate that antenna array 202 may be broken into any number of transmit subarrays greater than two. One of ordinary skill will also appreciate that, in one embodiment, the antenna array 202 may be subarrayed on receive instead of transmit, or by subarraying both transmit and receive. One of ordinary skill with further appreciate that multiple antennas may be used for transmit and receive instead of a single array. For example, system 100 may employ four separate transmit antenna arrays and a fifth array for receiving. In this way, any number of combinations of transmit and receive antennae may be used. The signals received by antenna array 202 may be downconverted and digitized according to methods known in the art. The now digital information may be processed by computing device 204 according to program modules shown in FIG. 2. Computing device 204 may be a computer, such as a laptop, a custom computing device, or any other computing device known in the art sufficient for receiving data from antenna array 202 and to complete the processes and steps described below.

As shown in FIG. 2, computing device may implement a series of program modules. These program modules may be stored on a nontransitory storage medium on computing device 204, and loaded into primary memory at runtime. The program modules broadly comprise a DC subtraction/AMTI program module 206 programmed to, in various embodiments, receive a plurality of SAR images, apply a DC subtraction across each image on a pixel-by-pixel basis, and/or to apply an adaptive MTI algorithm to the resulting pixels. The resulting pixels may then be input to a DFT module 208 (which may be implemented as an FFT) the output of which may be input to a Detector/Doppler estimation module 210 for final integration (detection) and Doppler estimation.

Figure 3:
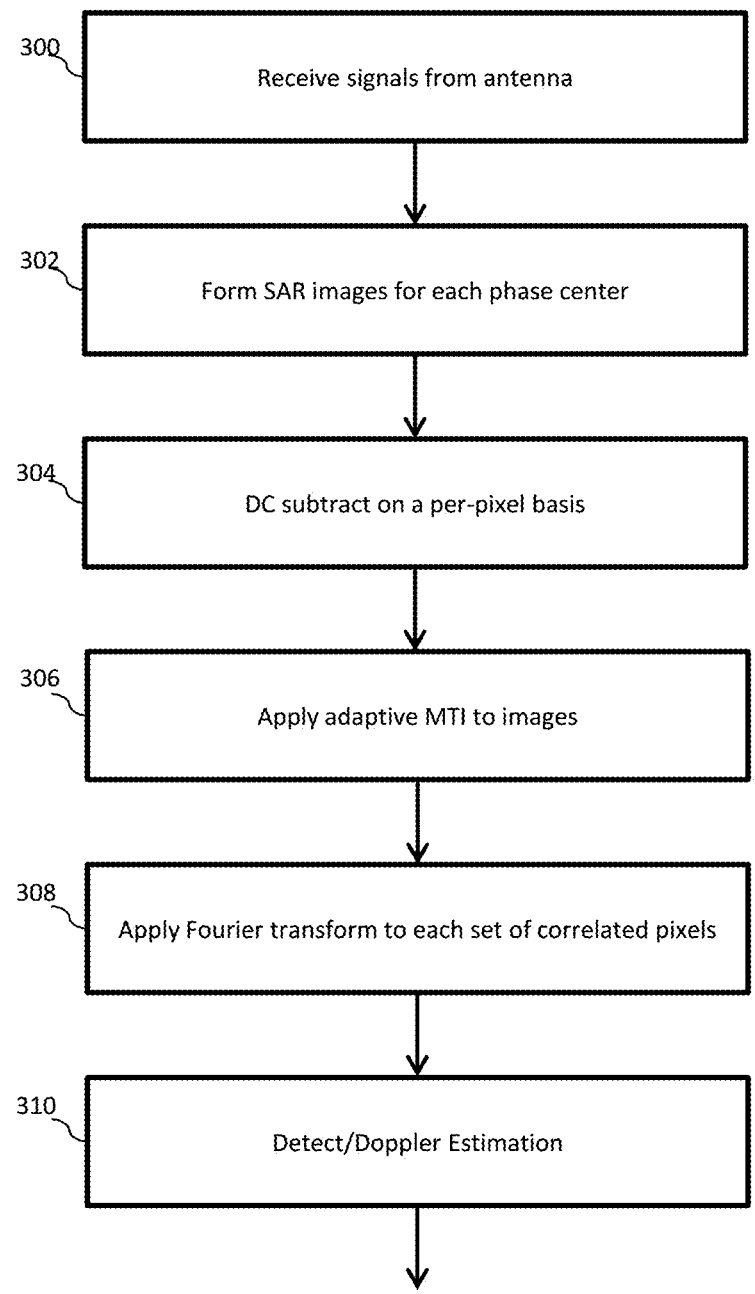
FIG. 3 shows a flowchart of a method according to an embodiment.

FIG. 3 shows an embodiment of an algorithm (method) which, in an exemplary embodiment, is collectively implemented by the program modules described above. Beginning in step 300, signals are received by antenna 202, or from some other source. In step 302, synthetic aperture radar (SAR) images are formed for each phase center. Each SAR image, in an exemplary embodiment, is substantially spatially aligned but temporally staggered. This may be achieved by keying each transmit subarray (or antenna) to speed of the aircraft to which the antenna(e) is mounted, such that each the two-way phase center are aligned at the same point in space. For example, for four transmitting subarrays, as shown in FIG. 2, each having a two-way phase center separated by a distance, D, and a platform moving at velocity $v_p$, the time in between the formation of images may be determined by the equation:

$$\Delta T = \frac{D}{v_p}$$

To illustrate this, if D is approximately 1 m, and the platform is moving at approximately 250 m/s, $\Delta T$ will be approximately 4 ms. Accordingly, each pulse for a set of N transmitting antennas may be characterized by the following equations:

two-way phase center 1: $e^{j\omega_d t}$ two-way phase center 2: $e^{j\omega_d(t-\Delta T)}$

...

two-way phase center N: $e^{j\omega_d(t-\Delta T[N-1])}$

Once each subarray has transmitted multiple times, a SAR image may be formed from the pulses received from a particular subarray corresponding to a specific synthetic aperture, resulting in multiple spatially aligned SAR images. The SAR images may be formed according to known methods in the art. In addition, one of ordinary skill will recognize any other technique, such as interpolation, or combination of techniques, may be employed to spatially align the returns from each two-way phase center.

Figure 4:
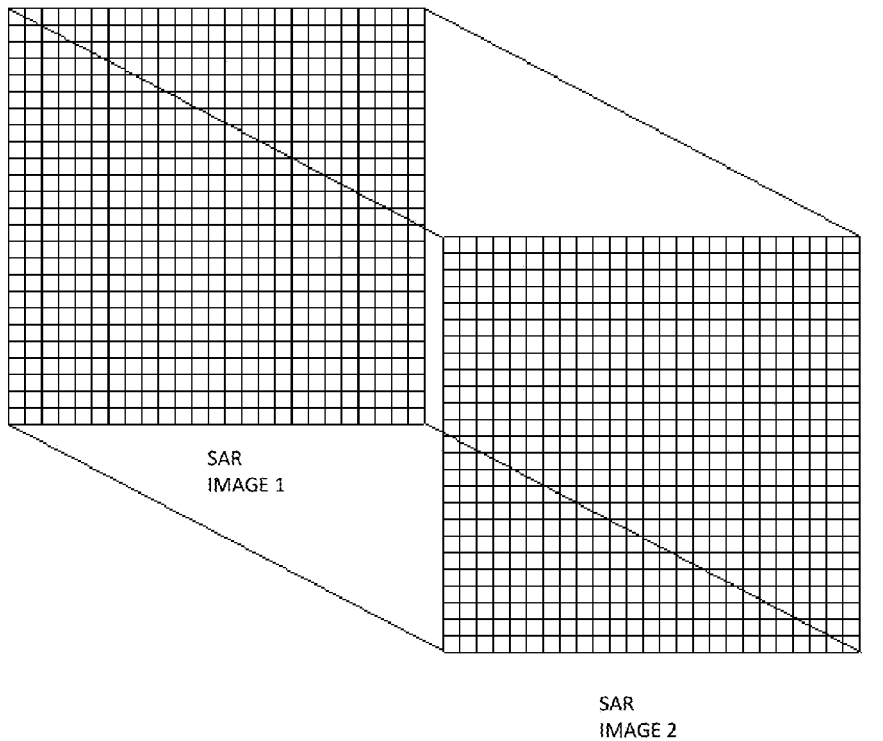
FIG. 4 shows a schematic of plurality of SAR images according to an embodiment.
Figure 4:
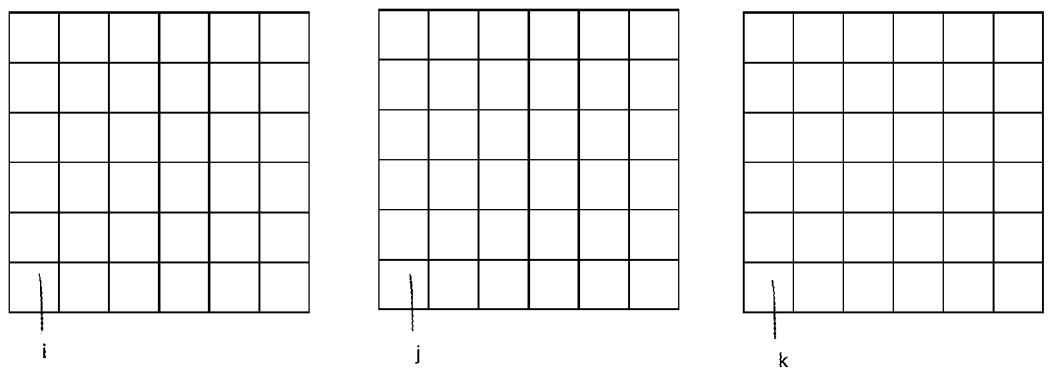

Furthermore, each image may be co-registered such that the common features of each image are matched together. To accomplish this, each pixel may be matched to the pixel in each of the remaining image representing the same spatial feature. For example, as shown in FIG. 4, pixels i, j, and k, representing the same spatial feature, may be matched to form a set of co-registered pixels. The co-registration algorithm may be as simple as co-registering each pixel located at the same address in each image, or may comprise one or more complex algorithms as are known in the art.

Figure 5:
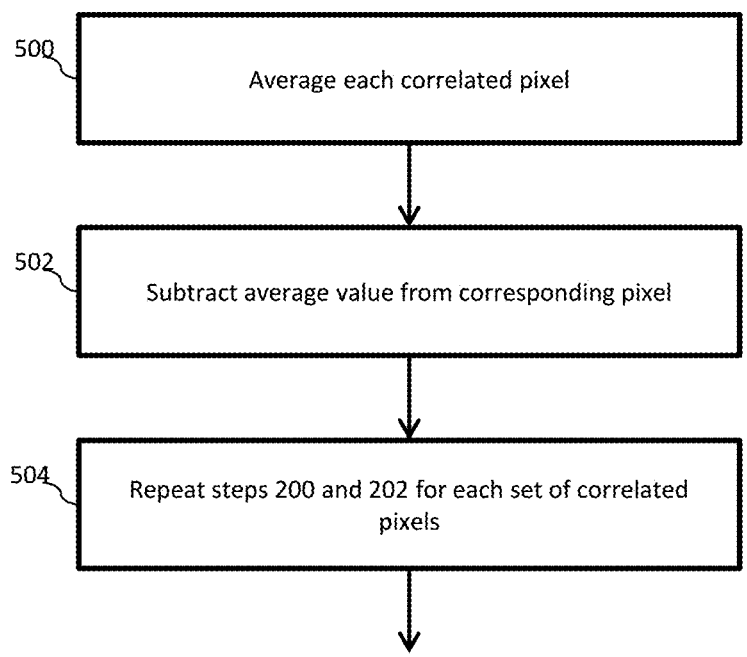
FIG. 5 shows a flowchart of a method according to an embodiment.

In step 304, as shown in FIG. 3, the clutter cancelation module 206 (shown in FIG. 3 as DC Subtraction/AMTI 206) may operate to cancel the clutter in each image. To cancel the clutter, clutter cancelation module 206 may apply DC subtraction to the received SAR images. DC subtraction, in an exemplary embodiment, comprises calculating the average value across images on a pixel-by-pixel basis and then subtracting the average from each image on a pixel per pixel basis. FIG. 5 displays the sub-steps of step 304 according to an exemplary embodiment. In step 500, each correlated pixel is averaged. In step 502, the averaged value is subtracted from each pixel from which the average was derived in step 500. For example, referring again to FIG. 4, pixels i, j, and k are coregistered and thus are averaged The average value of pixels i, j, and k would then be subtracted from each of pixels i, j, and k. In step 504, steps 500 and 502 are repeated for each set of co-registered pixels. The clutter cancelation module outputs at least one set of clutter canceled pixel values.

With perfectly stationary clutter, identical antenna patterns, and no errors, the DC subtraction module, should perfectly cancel the stationary clutter. However, error may be introduced during operation, including: internal clutter motion, imperfect motion compensation, imperfect image registration, non-constant platform velocity, non-identical two-way antenna patterns, multipath etc. As a result, some stationary clutter will remain after the DC subtraction step. Furthermore, beyond simply cancelling stationary clutter, it is preferable to maximize signal-to-interference ratio. To accomplish this, in step 306, a temporally adaptive moving target indication algorithm (hereinafter, AMTI) may be applied. Here, the adaptive weights may be calculated and applied over patches of each SAR image, known as sub-images, to allow for variations across the images. AMTI, assuming good training data with representative clutter and no target components, will account for uncompensated background phase differences, crab effects, and variations in clutter amplitude. In particular, if targets exist outside of clutter in some pixels, the minimum detectable velocity can approach zero. The size of sub-images and guard zone around a pixel of interest may be determined by computational loading, prevention of target cancellation, and expected degree of spatial variations across the images. The AMTI algorithm may be applied in place of, or in addition to, the DC subtraction. In either instance, the output of clutter cancelation module is at least one set of clutter canceled pixel values. One of ordinary skill in the art will appreciate that other clutter cancelation algorithms suitable for cancelling stationary clutter, having uniform amplitude and phase, can be implemented in place of the DC subtract or AMTI steps.

Furthermore, additional processing to minimize clutter residue after DC subtract/AMTI, such as equalization of each image, can be implemented as part of the pulse compression stage. And motion compensation may be used to phase normalize each of the images. As a result of the above processes, the stationary clutter in each image should have the same amplitude and phase.

After the clutter cancellation steps, implemented in steps 304 and 306 (or either), the clutter will be cancelled to the extent possible given the degrees of freedom available. In step 308, final integration and Doppler frequency (and range-rate) may be obtained via a Fourier transform. In this step, the IQ values of each co-registered (and now clutter-canceled) set of pixels may be input to the DFT module as a measurement vector. It will be appreciated by a person of ordinary skill in the art that the DFT module may implement a fast Fourier transform algorithm. In the absence of zero padding, very little residue will be present in the zero Doppler bin, indeed no residue may be left as a result of DC subtraction performed in step 304. Accordingly, zero padding may be used to minimize scalloping loss and improve Doppler estimation. If there are enough images (i.e, degrees of freedom), a tailored DFT may be applied to obtain a desired response around zero Doppler to compensate for uncancelled clutter at non-zero Dopplers—this must be balanced against minimum detectable velocity as will be apparent to a person of skill in the art. Using this DFT approach, targets may be detected using standard radar techniques as are understood in the art, without the added complexity of ATI.

The range-rate of any detected target may be estimated from the output of the FFT, using any technique known in the art. However, because of the notch at zero Doppler resulting from the above process, normal techniques employing interpolation will not work well for estimating range-rate at low Dopplers. Accordingly, in an exemplary embodiment, range-rate may instead be estimated from Doppler using a table lookup.

Figure 6:
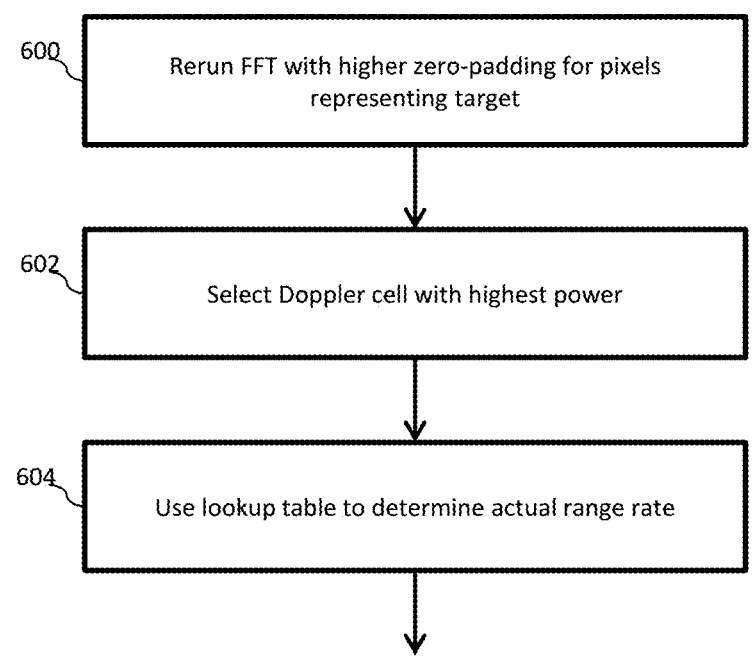
FIG. 6 shows a flowchart of a method according to an embodiment.

For example, FIG. 6 shows an exemplary method for determining rang-rate from Doppler using a lookup table. In step 600, when a target is detected in a particular pixel, the FFT may be recalculated for that pixel using much higher zero padding. For example, the FFT in step 308 may be implemented with a 512 point FFT, whereas the FFT in step 600 may be implemented with a 1024 point FFT. It will be appreciated by a person of skill in the art, that the FFT in step 308 is not applied with a higher zero padding because of processing constraints. Accordingly, the FFT in step 308 may be implemented with a highly zero padded FFT, at some processing cost, and step 600 may be avoided altogether. In an alternate embodiment, step 600 may be bypassed, and the lower zero-padded FFT of step 308 may be used in place of a higher zero padded FFT with some degradation in resolution.

In step 602, the Doppler cell or cells containing the target may be selected. In an exemplary embodiment, the cell having the highest power is selected. In an alternate embodiment, multiple cells, or a portion of a cell may be selected, as will be appreciated by a person of skill in the art.

Figure 7:
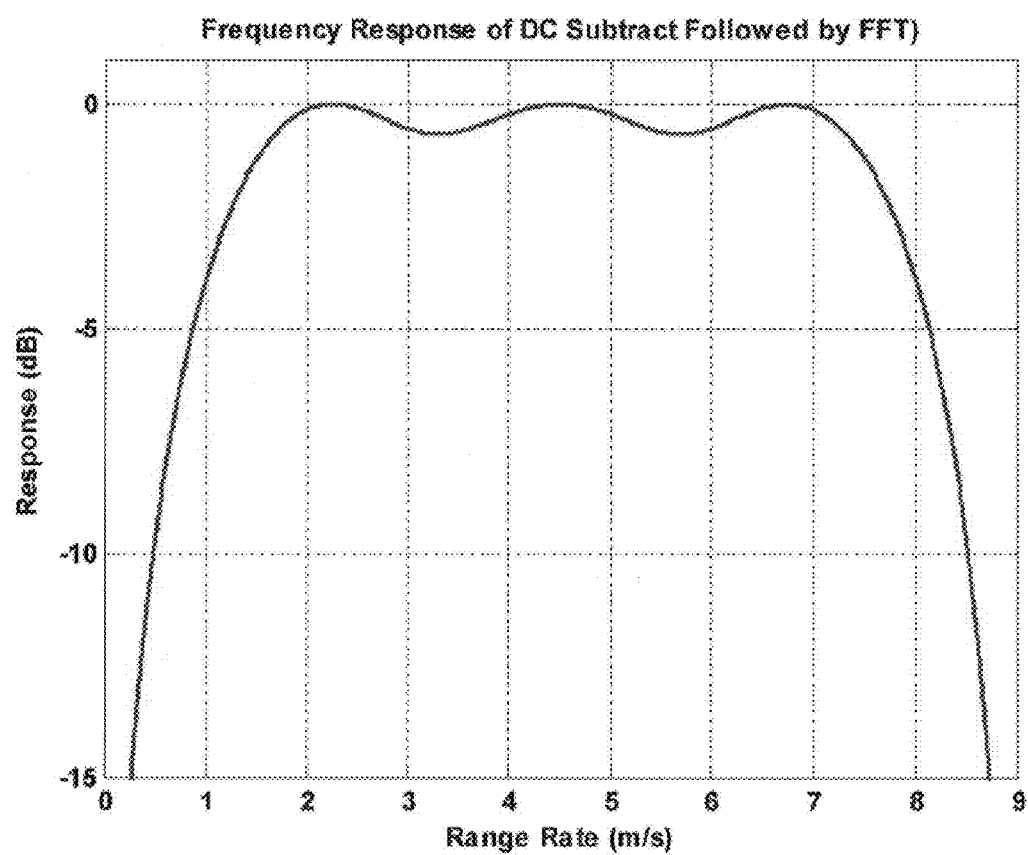
FIG. 7 shows a graph according to an embodiment.
Figure 8:
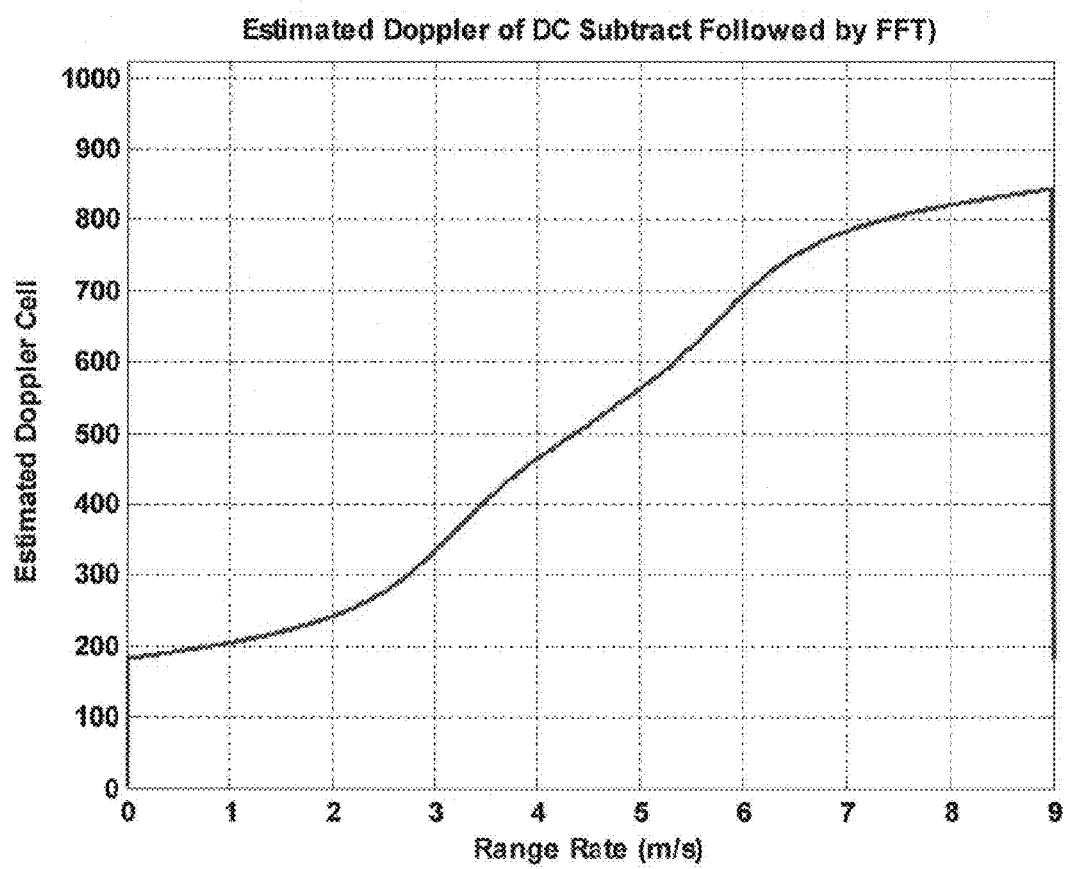
FIG. 8 shows a graph according to an embodiment.

In step 604 a lookup table may be used to estimate the actual target range-rate. FIG. 7 shows an exemplary Doppler frequency response curve following DC subtract. Because of the notch, the Doppler cell containing the peak response for a given target range-rate is displayed in FIG. 8 (for a specific example of four phase centers separated in time by 1 ms at 16.7 GHz), where a 1024-point FFT was used. This curve can be used to map the Doppler cell with the highest response to the target's range-rate. (Note that in the absence of the DC subtract, the curve would be a straight line from the bottom left corner to the upper right corner.) Range-rate accuracy will be somewhat degraded for range-rates on the ends of the curve (at low and nearly ambiguous range-rates.) It will be appreciated by a person of ordinary skill that a "lookup table" may comprise any way for correlating a plurality of input values with a plurality of output values. In this way, the lookup table may take the form of an actual table of values, a curve, or a function.

A "module," as may be used herein, can include, among other things, the identification of specific functionality represented by specific computer software code of a software program. A software program may contain code representing one or more modules, and the code representing a particular module can be represented by consecutive or non-consecutive lines of code.

As will be appreciated by one skilled in the art, aspects of the present invention may be embodied/implemented as a computer system, method or computer program product. The computer program product can have a computer processor or neural network, for example, that carries out the instructions of a computer program. Accordingly, aspects of the present invention may take the form of an entirely hardware embodiment, an entirely software embodiment, and entirely firmware embodiment, or an embodiment combining software/firmware and hardware aspects that may all generally be referred to herein as a "circuit," "module," "system," or an "engine." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowcharts/block diagrams in the Figures illustrate the architecture, functionality, and operation of possible implementations of systems, methods, and computer program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for detecting the motion of a moving target, with a radar system including an antenna and a computing device including a nontransitory storage medium, comprising:
    receiving a first set of inputs from the antenna;
    receiving a second set of inputs from the antenna, wherein the second set of inputs are substantially sequentially spatially aligned with the first set of inputs;
    forming a first SAR image, at the computing device, from the first set of inputs, the first SAR image having at least a first pixel comprising a first value;
    forming a second SAR image, at the computing device, from the second set of inputs, the second SAR image having at least a second pixel comprising a second value, the second SAR image having been formed after the first SAR image;
    inputting the first value and second value to a clutter cancelation processing module, programmatically defined by the computing device, and receiving from the clutter cancelation processing a first clutter canceled pixel value and a second clutter canceled pixel value;
    inputting the first clutter canceled pixel value and the second clutter canceled pixel value into an DFT processing module programmatically defined by the computing device; and
    receiving from the DFT processing module a first DFT output comprising a plurality of Doppler bins;
    comparing a first value of at least one Doppler bin from the first plurality of Doppler bins to a predetermined value to determine whether the first value of the at least one Doppler bin from the first plurality of Doppler bins is representative of a moving target;
    receiving from the DFT processing module a second DFT output comprising a second plurality of Doppler bins;
    comparing a second value of at least one Doppler bin of the second plurality of Doppler bins to a predetermined lookup table, the lookup table associating a plurality of Doppler bins values with a plurality of range-rate values, to correlate the second value to at least one of the range-rate values within the lookup table.

2. The method of claim 1, wherein the clutter cancellation module performs the steps of:
    averaging the first value and second value to produce an averaged value; and
    subtracting the averaged value from the first pixel value and the second pixel value to produce the first clutter canceled pixel value and the second clutter canceled pixel value.

3. The method of claim 1, further comprising the steps of:
    transmitting a first signal from a first subarray;
    receiving with the radar antenna the first signal;
    transmitting a second signal from a second subarray; and
    receiving with the radar antenna the second signal.

4. The method of claim 1, further comprising the step of inserting a predetermined number of zeros to the DFT processing module after inputting the first clutter canceled pixel value and the second clutter canceled pixel value.

5. The method of claim 1, further comprising the step of:
    selecting from the first DFT output at least one Doppler bin; and
    comparing the selected Doppler bin to a predetermined lookup table, the lookup table associating a plurality of Doppler bins with a plurality of range-rate values, to correlate the selected Doppler bin to at least one of the range-rate values within the lookup table.

6. The method of claim 1, further comprising the steps of:
    reinputting to the DFT processing module the first clutter canceled pixel value and the second clutter canceled pixel value followed by a predetermined number of zero values, upon determining that the first DFT output contained a value representative of a moving target.

7. The method of claim 6, wherein the selected value is a greatest value of the Doppler bin values.

8. The method of claim 1, wherein the DFT processing module implements an FFT.

9. A radar system for detecting the motion of a moving target, comprising:
    a computing device having a nontransitory storage medium comprising:
    a clutter cancelation processing module, programmed to receive a first value of a first pixel from a first SAR image, and a second value of a second pixel from a second SAR image, the second SAR image being spatially aligned with the first SAR image, the second SAR image having been formed after the first SAR image, and to output a first clutter canceled pixel value and a second clutter canceled pixel value;

a DFT processing module programmed to receive the first clutter canceled pixel value and the second clutter canceled pixel value and to output a first DFT output comprising a plurality Doppler bins; and a detector module programmed to compare a first value of at least one Doppler bin from the first plurality of Doppler bins to a predetermined value to determine whether the first value of the at least one Doppler bin from the first plurality of Doppler bins is representative of a moving target, wherein the detector module is further programmed to receive from the DFT processing module a second DFT output comprising a second plurality of Doppler bins, and to compare a second value of at least one Doppler bin of the second plurality of Doppler bins to a predetermined lookup table, the lookup table associating a plurality of Doppler bins values with a plurality of range-rate values, to correlate the second value to at least one of the range-rate values within the lookup table.

10. The system of claim 9, wherein the clutter cancelation processing module is programmed to:
average the first value and second value to produce an averaged value; and
subtract the averaged value from the first pixel value and the second pixel value to produce the first clutter canceled pixel value and the second clutter canceled pixel value.

11. The system of claim 9, wherein the computing device further comprises a program module programmed to:
receive a first set of inputs from a radar antenna;
receive a second set of inputs from the radar antenna, wherein the second set of inputs are sequentially spatially aligned with the first set of inputs;
form the first SAR image from the first set of inputs; and
form the second SAR image from the second set of inputs.

12. The system of claim 9, further comprising:
an antenna configured to transmit a first signal from a first subarray, to receive the first signal, to transmit a second signal from a second subarray and to receive the second signal.

13. The system of claim 9, wherein DFT processing module is further programmed to insert a predetermined number of zeros after inputting the second clutter canceled pixel value.

14. The system of claim 9, wherein the detector module is further programmed to:
select from the first DFT output at least one Doppler bin; and
compare the selected Doppler bin to a predetermined lookup table, the lookup table associating a plurality of Doppler bins with a plurality of range-rate values, to correlate the selected Doppler bin to at least one of the range-rate values within the lookup table.

15. The system of claim 9, wherein the DFT processing module is further programmed to:
re-input the first clutter canceled pixel value and the second clutter canceled pixel value followed by a plurality of zero values, upon a determination by the detector module that the first DFT output contained a value representative of a moving target.

16. The system of claim 15, wherein the selected value is a greatest value of the Doppler bin values.

17. The system of claim 15, wherein the detector module is programmed to determine that the DFT output contains a value by comparing the output of the DFT module to a predetermined value.

18. The system of claim 9, wherein the DFT processing module implements an FFT.

* * * * *